W. E. WOODS.
AUTOMATIC WAGON BRAKE.
APPLICATION FILED OCT. 15, 1908.
913,342.
Patented Feb. 23, 1909.
2 SHEETS—SHEET 2.
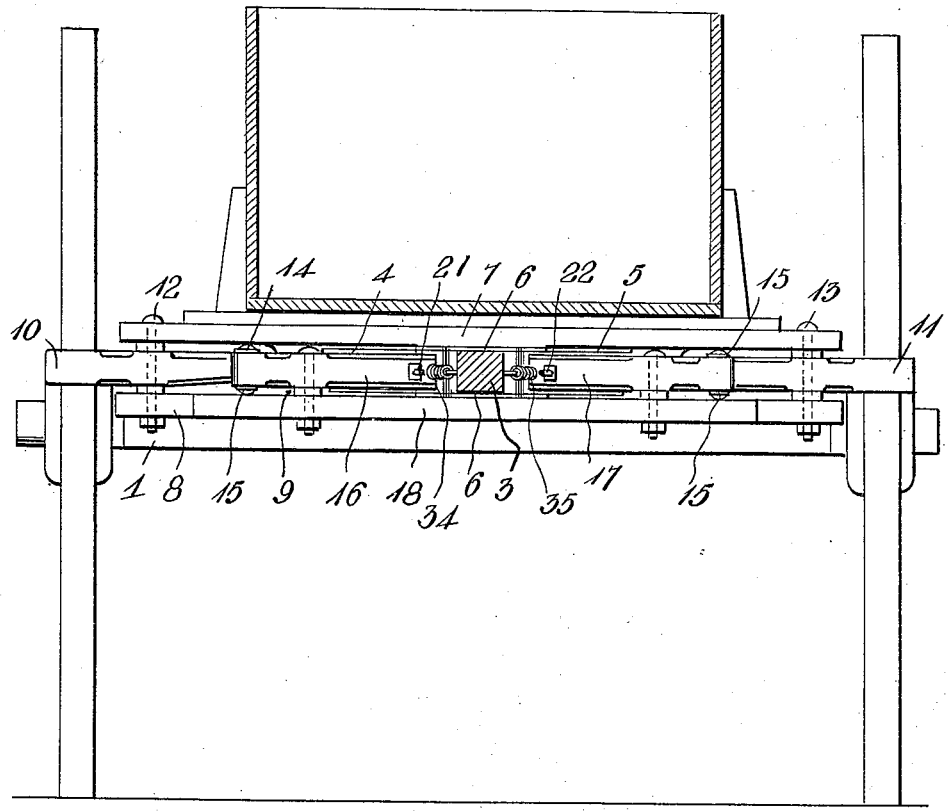
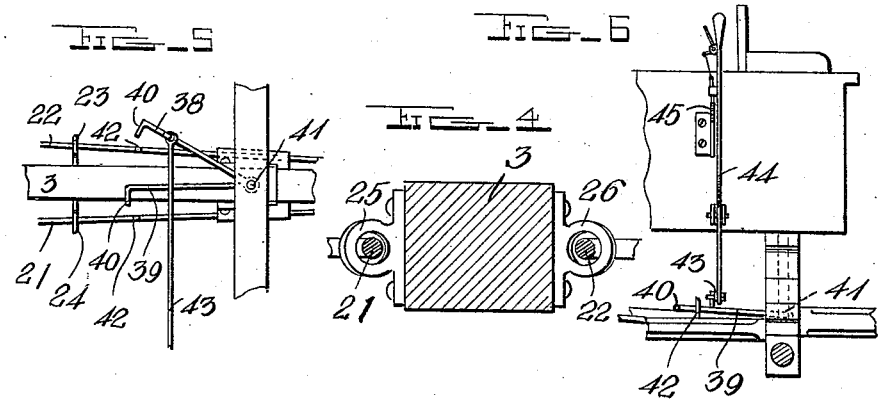
Witnesses
Inventor
W. E. Woods

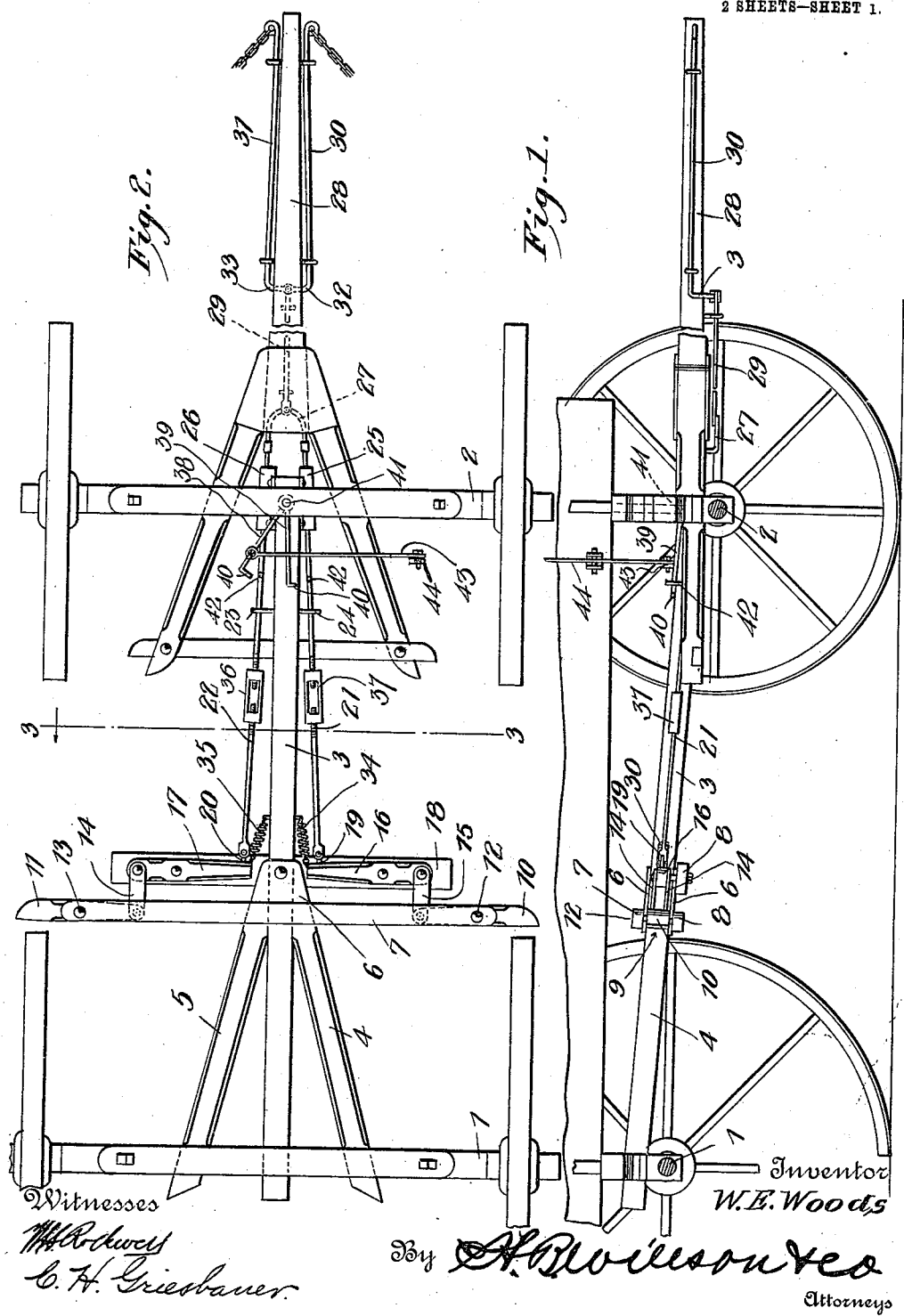

UNITED STATES PATENT OFFICE.

WILLIAM E. WOODS, OF GRIFFIN, INDIANA.

AUTOMATIC WAGON-BRAKE.

No. 913,342.  Specification of Letters Patent.  Patented Feb. 23, 1909.

Application filed October 15, 1908. Serial No. 457,905.

*To all whom it may concern:*

Be it known that I, WILLIAM E. WOODS, a citizen of the United States, residing at Griffin, in the county of Posey and State of Indiana, have invented certain new and useful Improvements in Automatic Wagon-Brakes; and I do declare the following to be a full, clear, and exact description of the invention, such as will enable others skilled in the art to which it appertains to make and use the same.

This invention relates to automatic wagon brakes, and contemplates the construction of a wagon brake arranged to be automatically applied by a backward movement of the draft animals against the wagon tongue.

One of the objects of the invention is the construction of an automatic wagon brake comprising leverage means and an operating rod arranged to extend forwardly on the reach rod and forwardly on the wagon tongue and connected with the yokes of a team of draft animals in such manner that the backward movement of the animals against the tongue will automatically apply the brake.

With these and other objects in view, the invention consists of certain novel features of construction, combination and arrangement of parts as will be described and particularly pointed out in the appended claims, and in the accompanying drawings, in which, Figure 1 is a side elevation of my improved automatic wagon brake; Fig. 2 is a plan view thereof; Fig. 3 is a transverse sectional view taken on the line 3—3 of Fig. 2. Fig. 4 is a detail transverse sectional view; Fig. 5 is a detail plan view of a clutch lever mechanism. Fig. 6 is a detail side elevation view of the operating parts of the disconnecting brake on an enlarged scale.

In the drawings, 1 and 2, denote axles, which are of the usual type, and 3 denotes a reach bar which extends centrally between the axles and is connected therewith in any approved manner. A plurality of braces, 4 and 5, extends forwardly of the rear axle, 1, and are connected by means of a strap or securing plate, 6, to the reach bar, 3. At the point where the braces 4 and 5 are connected to the reach bar, 3, a plurality of cross bars, 7 and 8, is secured on opposite sides of said reach bar and against the ends of said braces so as to form spaces, 9, across which the brake shoes, 10 and 11, are arranged to move. The brake shoes, 10 and 11, are pivoted by means of pins, 12 and 13, at a point intermediate of their ends to the ends of the cross bars, 7 and 8, and are connected at their inner ends to link straps, 14 and 15, which extend forwardly in a horizontal plane, and substantially parallel with the reach bar 3. The straps, 14 and 15 are pivotally connected with operating levers, 16 and 17, on the outer ends of said levers, and said levers are pivotally mounted at a point intermediate of their ends and nearer the outer ends than the inner ends to a cross bar, 18, which extends across the reach bar, 3, and is connected to the underside thereof. The inner ends of the levers, 16 and 17, are provided with looped screw bolts, 19 and 20, which are connected to forwardly-extending operating rods, 21 and 22. The operating rods, 21 and 22, are arranged to extend forwardly against the opposite sides of the reach bar, 3, and are guided in their movement against said reach bar by looped screw bolts, 23 and 24, and tubular guide braces, 25 and 26, which are suitably connected to the sides of the reach bar, 3. The forward ends of the operating rods 21 and 22 are arranged to project beyond the end of said reach bar and the ends of the tubular guide and are united by a U-shaped link, 27. The U-shaped link, 27, is arranged to extend directly beneath a wagon tongue, 28, and forms a connection with a front operating rod, 29, which is slidably secured to the underside of the wagon tongue by means of tubular guides and screw bolts similar to those that slidably hold the operating rods, 21 and 22, in position against the reach bar, 3. The operating rod, 29, terminates near the ends of the wagon tongue, 28, and is connected to a plurality of rods, 30 and 31, which are secured to the sides of the wagon tongue and slidable thereon by means of bent arms, 32 and 33, formed on said rods. The rods, 30 and 31, are also connected with chains, or straps, which are united to the yokes. The construction of my improved automatic wagon brake is such that the backward movement of the draft animals will force the rods, 30 and 31, rearwardly on the wagon tongue, this movement causing the operating rod, 29, to move rearwardly, and operating rods, 21 and 22, to transmit motion from operating rod, 29, to the levers, 16 and 17, thereby forcing the brake shoes, 10 and 11, against the periphery of the rear wagon wheels.

The wagon brake shoes are normally held by means of springs, 34 and 35, which are connected to the ends of the levers, 16 and 17, and extend forwardly therefrom to the reach bar, 3, with which they are connected at their forward ends. The springs, 34 and 35, are positioned on opposite sides of the reach bar, and should it be desired they may be located rearwardly of the levers, 16 and 17, and adapted to exert a forward tension against said levers.

When the wagon tongue is moved laterally on the reach bar, 3, the operating rod, 29, by its connection with the U-shaped link, 27, will move radially so that its forward end may be positively engaged by the rods, 30 and 31.

The rods, 21 and 22, are preferably provided with turn-buckles, 36 and 37, whereby the same may be longitudinally adjusted. In order to prevent the rods 21 and 22, from being operated, I provide a locking or holding brake comprising a pair of clutch arms, 38 and 39, which are formed with bent ends, 40. The clutch arms, 38 and 39 are preferably formed of a single section of material and pivoted at 41 to the reach bar, 3. The ends, 40, of the clutch arms, 38 and 39, are adapted to engage with the rods, 21 and 22, which rods are formed with loops or stops, 42. and a link, 43, is connected to one of the clutch arms, preferably the arm 38, and on its outer end said link connects with a vertically disposed lever, 44, which is arranged to extend above the wagon bed and within convenient reach of the driver. Said lever is adapted to engage with a segmental rack, 45. The lever 44 is pivoted on the wagon body so that it will move laterally of the axis of the wagon and when the lower end of said lever is moved away from the reach bar, 3, the ends, 40, of the clutch arms, 38 and 39, will be brought into engagement with the stops, 42, of the rods, 22 and 27, and said rods will be thereby prevented from being moved on the reach bar when the draft animals back against the wagon. The rods 30 and 31 may be dispensed with and a single rod may be connected to the rod, 29.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent, is:

1. An automatic wagon brake arranged to be operated by the backward movement of the draft animals comprising a reach bar having axles mounted thereon, a plurality of cross bars mounted on the reach bar, brake shoes pivotally mounted on the ends of the cross bars, links connected to the inner ends of the brake shoes, levers connected to the links, means for supporting the levers, a plurality of operating rods for moving the levers and the brake shoes, a forward operating rod for operating the last-mentioned operating rods having connections with the yokes of the draft animals and means for holding the operating rods in an inoperative position.

2. An automatic brake of the type described, comprising a reach bar provided with a plurality of axles having wheels mounted thereon, cross bars secured to opposite sides of the reach bar, brake shoes secured between and to the ends of the cross bars, links pivotally secured to the brake shoes, levers pivotally secured to the links, a cross bar for pivotally supporting the levers, operating rods connected to the levers, a U-shaped link for connecting the ends of the operating rods, and means connected to the U-shaped link extending forward against the underside of the wagon tongue having connections with the yokes of the draft animals for applying the brake shoes against the rear wagon wheels.

3. An automatic wagon brake comprising a reach bar provided with a plurality of axles carrying wagon wheels, a plurality of cross bars secured to opposite sides of the reach bar, a plurality of brake shoes pivotally connected to the ends of the cross bar, links secured to the inner ends of the brake shoes, levers secured to the links, means for pivotally supporting the levers on the reach bar, operating rods extending forwardly and having connections with the levers, means for guiding the operating rods against the sides of the reach bar, a U-shaped strap for connecting the ends of the operating rod, an operating rod connected to the U-shaped strap and arranged to move radially thereon, means for guiding the last-mentioned operating rod on the tongue of a wagon, and means for connecting the operating rod last mentioned with the yokes of draft animals.

4. An automatic wagon brake of the type described, comprising a reach bar, axles arranged on the reach bar, cross bars mounted on the reach bar, brake shoes pivotally mounted on the ends of the cross bars, lever means connected to the brake shoes, forwardly extending rods connected to the lever means, guides for the rods, clutch arms pivotally secured to the reach bar for preventing the rods from being operated, and a lever extending upwardly arranged to operate the clutch arms.

5. An automatic wagon brake of the class described, comprising a reach bar provided with a plurality of axles, cross bars arranged on the reach bar, brake shoes pivotally supported on the cross bars, means for operating the brake shoes, rods connected with the operating means, stops arranged on the rods, clutch arms arranged to engage the stops, a link connected with the clutch arms, and a vertically pivoted lever for operating the link.

In testimony whereof I have hereunto set my hand in presence of two subscribing witnesses.

WILLIAM E. WOODS.

Witnesses:
JOHN F. VANWAY,
CHARLES WESTHYDEMANN.